United States Patent [19]
Nishimura et al.

[11] Patent Number: 6,132,906
[45] Date of Patent: Oct. 17, 2000

[54] NONAQUEOUS BATTERY

[75] Inventors: Naoto Nishimura, Kashihara; Takehito Mitate, Yamatotakada; Kazuo Yamada, Kitakatsuragi-gun; Yoshihiro Tsukuda, Osaka; Tsutomu Takatera, Kitakatsuragi-gun, all of Japan

[73] Assignee: Sharp Kabushiki Kaisha, Osaka, Japan

[21] Appl. No.: 09/205,187

[22] Filed: Dec. 4, 1998

[30] Foreign Application Priority Data

Dec. 9, 1997 [JP] Japan ................................. 9-338908

[51] Int. Cl.$^7$ ................................. H01M 10/26
[52] U.S. Cl. ................................. 429/326; 429/324
[58] Field of Search ................................. 429/324, 329, 429/333, 231.8, 231.95, 326

[56] References Cited

U.S. PATENT DOCUMENTS

| | | | |
|---|---|---|---|
| 4,615,959 | 10/1986 | Hayashi et al. | |
| 4,804,595 | 2/1989 | Bakos et al. | 429/194 |
| 4,808,497 | 2/1989 | Blomgren et al. | 429/194 |
| 4,849,311 | 7/1989 | Itoh et al. | 429/192 |
| 5,294,502 | 3/1994 | Shackle et al. | 429/192 |
| 5,879,417 | 3/1999 | Yamada et al. | 29/623.5 |

FOREIGN PATENT DOCUMENTS

| | | |
|---|---|---|
| 0 508 689 A1 | 10/1992 | European Pat. Off. |
| 0 714 149 A1 | 5/1996 | European Pat. Off. |
| 0 807 986 A1 | 11/1997 | European Pat. Off. |
| 2 493 609 | 5/1982 | France. |
| 61-214374 | 9/1986 | Japan. |
| 62-278774 | 12/1987 | Japan. |
| 3-59962 | 3/1991 | Japan. |
| 4-162363 | 6/1992 | Japan. |
| 4-206270 | 7/1992 | Japan. |
| 4-280082 | 10/1992 | Japan. |
| 5-82167 | 4/1993 | Japan. |
| 5-326023 | 12/1993 | Japan. |
| 94/02967 | 2/1994 | WIPO. |

OTHER PUBLICATIONS

Chemical Abstracts, vol. 120, No. 14, Apr. 4, 1994 Columbus, Ohio, US; abstract No. 168937, Ito, Tsukane et al; "Secondary Organic Electrolyte Batteries for Portable Devices".

Patent Abstracts of Japan, vol. 015, No. 240 (E–1079), Jun. 20, 1991 & JP 03 074060 A (Sanyo Electric Co Ltd), Jul. 28, 1992.

Patent Abstracts of Japan, vol. 018, No. 109 (E–1513), Feb. 22, 1994 & JP 05 308036 A (Nippon Chemicon Corp), Nov. 19, 1993.

*Primary Examiner*—Maria Nuzzolillo
*Assistant Examiner*—M. Wills
*Attorney, Agent, or Firm*—Nixon & Vanderhye

[57] ABSTRACT

A nonaqueous battery includes a negative electrode containing a carbon material capable of absorbing/desorbing lithium, metallic lithium or an lithium alloy, a positive electrode containing a chalcogenide and a nonaqueous ionic conductor. The nonaqueous ionic conductor contains a diether compound having ether linkages at 1- and 3-positions, 1- and 4-positions or the 2- and 3-positions of a straight-chain hydrocarbon having four carbon atoms.

13 Claims, 5 Drawing Sheets

NONAQUEOUS BATTERY

CROSS-REFERENCE TO RELATED APPLICATION

This application is related to Japanese application No. HEI9(1997)-338908, filed on Dec. 9, 1997, whose priority is claimed under 35 USC §119, the disclosure of which is incorporated by reference in its entirety.

BACKGROUND OF THE INVENTION

1. Field of the Invention

The present invention relates to a nonaqueous battery. More particularly, it relates to a nonaqueous battery including a negative electrode containing a carbon material capable of absorbing/desorbing lithium, metallic lithium or an lithium alloy, a positive electrode containing a chalcogenide, and a nonaqueous ionic conductor.

2. Description of Related Arts

In recent years, with increasing miniaturization of portable electronic devices, there is demand for, as power sources therefor, batteries of high voltage and high energy density which are capable of operating within a wide temperature range in consideration of environments in which they are used. For example, lithium batteries using metallic lithium as a negative-electrode active material have been developed and are now in use for cameras and memory back-up.

Lithium-ion secondary batteries capable of charging/discharging by use of a carbon material allowing lithium to be absorbed/desorbed or inserted/released have also been put into use recently. Nonaqueous ionic conductors used in these batteries are roughly classified into three types, that is, an electrolyte solution type containing a lithium salt dissolved in an organic solvent, a solid electrolyte type and a molten salt type. Generally the electrolyte solution type and the solid electrolyte are used.

However, further improvement in the quality of lithium secondary batteries is still demanded. For this purpose, the nonaqueous ionic conductor is expected to possess the following characteristics:

(1) Being stable to a positive and a negative electrode
(2) Exhibiting a high ionic conductivity in a broad temperature range
(3) Having a high boiling temperature or a low vapor pressure
(4) Being highly safe.

In nonaqueous ionic conductors of the electrolyte solution type, a non-protonic solvent which is stable with respect to the negative electrode and a solvent of a chain ether or of a carbonate which is stable with respect to the positive electrode are used for ensuring the characteristic (1). For ensuring the characteristic (2), a solvent mixture containing a solvent having a high dielectric constant and a solvent having a low viscosity is used. For ensuring the characteristic (3), substituent groups are introduced to a known solvent or the mixture ratio of the solvent having a low viscosity is optimized. For ensuring the characteristic (4), a chemically stable substance is used as an electrolytic salt.

As for nonaqueous ionic conductors of the solid electrolyte type, which has the characteristics (3) or (4) by nature, it has been proposed that polyethylene oxide, polypropylene oxide or the like be used in a basic composition for ensuring the characteristic (1) and that an organic solvent be added to the basis composition to improve the ionic conductivity for ensuring the characteristic (2).

From the above-mentioned viewpoints, it has been proposed for nonaqueous ionic conductors of the electrolyte solution type that a mixture solvent be used which contains a non-protonic solvent having a high dielectric constant and capable of dissolving an electrolytic salt as well as a chain ether or a chain ester for decreasing the viscosity of the non-protonic solvent and thereby improving the ionic conductivity at low temperatures.

For example, Japanese Unexamined Patent Publication No. HEI3(1991)-59962 discloses use of an ethylene glycol alkyl ether or a diethylene glycol alkyl ether in a lithium secondary battery whose positive-electrode active material is an electrically conductive polymer, for improving the ionic conductivity.

However, there remains a problem in that the electrically conductive polymer composing the positive electrode is low in density and the secondary battery using such a positive electrode is lower in energy density than the one using a positive electrode containing a chalcogenide.

Japanese Unexamined Patent Publication No. HEI 4(1992)-162363 discloses a combination use of 1,2-dimethoxypropane with a carbonate for improving the ionic conductivity in a broader temperature range.

However, 1,2-dimethoxypropane is highly reactive to a graphite type negative electrode. Therefore, a sufficient performance is not obtained.

Further, Japanese Unexamined Patent Publication No. HEI 4(1992)-206270 discloses a combination use of a dialkoxyethane with a nonaqueous electrolyte solution for suppressing the reactivity of the electrolyte solution with the positive or negative electrode. Japanese Unexamined Patent Publication No. HEI 5(1993)-82167 proposes a combination use of propylene carbonate with dimethyl carbonate for suppressing the reactivity with the positive electrode. Japanese Unexamined Patent Publication No. HEI 4(1992)-280082 proposes use of dipropyl carbonate in a mixture solvent for suppressing the reactivity with metallic lithium or a carbon material having absorbed lithium which carbon material is hard to graphitize.

As regards ionic conductors of the solid electrolyte type, Japanese Unexamined Patent Publication Nos. SHO 61(1986)-214374 and SHO 62(1987)-278774 propose the complexing of a nonaqueous solvent with a polyalkyl methacrylate which is a polymeric solid electrolyte and the complexing of propylene carbonate or acetonitrile with polyacrylonitrile or polyvinylidene fluoride, respectively, for improving the ionic conductivity at low temperatures.

As described above, a variety of nonaqueous ionic conductors of the electrolyte solution type and of the solid electrolyte type have been proposed. However, no ionic conductors have not been realized yet that satisfies the requirements of being stable both to the negative-electrode active materials such as metallic lithium, a lithium alloy or a carbon material in which lithium is absorbed or inserted and to the positive-electrode active material such as a chalcogenide, exhibiting a high ionic conductivity in a broad temperature range and having an excellent stability at high temperatures.

SUMMARY OF THE INVENTION

The present invention provides a nonaqueous battery comprising a negative electrode containing a carbon material capable of absorbing/desorbing lithium, metallic lithium or an lithium alloy, a positive electrode containing a chalcogenide, and a nonaqueous ionic conductor, wherein the nonaqueous ionic conductor contains a diether compound having ether linkages at 1- and 3-positions, 1- and 4-positions or 2- and 3-positions of a straight-chain hydrocarbon having four carbon atoms.

DESCRIPTION OF THE PREFERRED EMBODIMENTS

Figure 1:
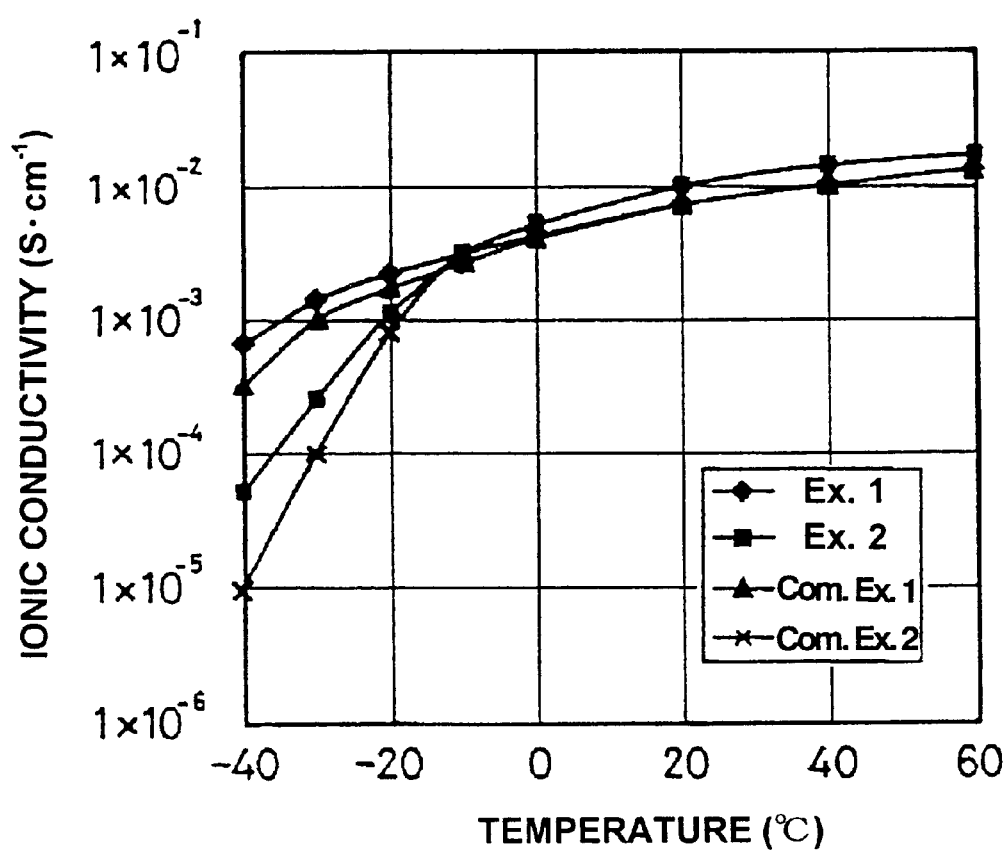
FIG. 1 is a graphical representation illustrating dependence on temperatures of the ionic conductivity of nonaqueous ionic conductors for a nonaqueous battery in accordance with the present invention.

The nonaqueous battery of the present invention includes a negative electrode, a positive electrode and a nonaqueous ionic conductor, mainly.

The negative electrode of the present invention is composed mainly of a negative-electrode active material, a binder, an electric collector and optionally an electric conductor.

The negative-electrode active material may be metallic lithium, a lithium alloy or a carbon material capable of absorbing/desorbing lithium.

Examples of the carbon materials capable of absorbing/desorbing (inserting/releasing) lithium include materials allowing lithium ions to be doped therein/undoped therefrom such as electrically-conductive polymers (e.g., polyacetylene, polythiophene, polyparaphenylene); pyrolyzed carbons; pyrolyzed carbons thermally decomposed in a gas phase in the presence of a catalyst; carbons produced by calcining pitch, coke, tar or the like; carbons produced by calcining a polymer such as cellulose or phenol resins; inorganic compounds (e.g., $WO_2$, $MoO_2$); and materials allowing lithium ions to be intercalated therein/deintercalated therefrom such as graphite (e.g., natural graphite, artificial graphite, expansive graphite). These materials may be used either alone or as a composite thereof. Among these materials, pyrolyzed carbons, pyrolyzed carbons thermally decomposed in a gas phase in the presence of a catalyst, carbons produced by calcining pitch, coke, tar or the like, carbons produced by calcining a polymer and graphite are preferred since these are useful for producing a safe battery having good battery characteristics. Further, a graphite whose mean spacing between the (002) planes ($d_{002}$) is 0.335 to 0.340 nm and whose lattice thicknesses in directions of (002) plane (Lc) and (110) plane (La) are each 10 nm or more by X-ray wide-angle diffractometry is more preferred because it has a high crystallinity and exhibits a large discharge capacity per unit of the active material. Also preferred is a negative-electrode active material of graphite particles having amorphous carbons adhering to surfaces thereof because such a negative-electrode active material can be used with an electrolyte solution containing a large amount of propylene carbonate. Propylene carbonate is excellent in low-temperature characteristics, and therefore, a high capacity can be realized.

As metallic lithium or the lithium alloy, usable is lithium alone, a lithium/aluminum alloy, a lithium/tin alloy, a lithium/lead alloy, Wood's alloy or the like.

Among the above-mentioned negative-electrode active materials, the carbon capable of absorbing/desorbing lithium is preferred in view of cycle characteristics, while metallic lithium is preferred in view of production of a light-weight battery of high voltage.

In the case where the electrically conductive polymer, carbon, graphite or inorganic compound is used as the negative-electrode active material for a negative electrode, a binder and/or a conductor may be used. The binder is not particularly limited, but examples thereof include fluorine-containing polymers such as polytetrafluoroethylene and polyvinylidene fluoride, polyolefins such as polyethylene, polypropylene and ethylene-propylene copolymer, and styrene-butadiene rubber.

The conductor is not particularly limited, but examples thereof include carbons such as carbon black, acetylene black and ketchen black, graphite particles (natural graphite, artificial graphite), metal particles, and metal fibers.

The mixture ratios of the binder and the conductor may be varied depending on the kinds of the binder and the conductor, but for example, the mixture ratio of the binder may be about 1 to 30 parts by weight and that of the conductor may be about 1 to 50 parts by weight, with respect to 100 parts by weight of the negative-electrode active material. The binder, if used at a mixture ratio smaller than one part by weight, cannot exhibit its binding ability. If the binder is used at a mixture ratio greater than 30 part by weight, the amount of the active material contained in the electrode decreases and the resistance or polarization of the electrode increases. As a result, the discharge capacity declines. Therefore, such mixture ratios are not practical. If the conductor is used at a mixture ratio smaller than one part by weight, the resistance or polarization of the electrode increases and the discharge capacity declines. Therefore, a battery for practical use cannot be produced. If the conductor is used at a mixture ratio greater than 50 parts by weight, the amount of the active material contained in the negative electrode decreases and consequently the discharge capacity of the negative electrode declines. Therefore, such mixture ratios are not preferable.

The collector mediates transfer of electrons from and to the negative electrode and may be made of a metal alone or an alloy. Examples thereof include copper, nickel or stainless steel, whose surface may optionally be oxidized. The collector may be in the form of foil, film, sheet or net, in a punched, lath, porous or foamed form, or in a structure made of fibers, but the form of the collector is not particularly limited. The thickness of the collector may be about 1 $\mu$m to 1 mm, for example.

The negative electrode can be formed by various processes. For example, the negative-electrode active material, the binder and the like may be mixed and pelletized by compression. The negative-electrode active material, the binder and the like may be made into paste with an appropriate solvent, then the paste may be applied onto the collector, dried and compressed to form a sheet. It is noted that, in the formation of the negative electrode and the formation of the positive electrode, which are described later, it is preferable to perform thermal treatment at a temperature near the melting point of a used binder and higher than the boiling point of a used solvent, for improving binding.

The positive electrode of the nonaqueous battery is composed mainly of a positive-electrode active material, an electric conductor, a binder, a collector, and optionally a solid electrolyte.

As the positive-electrode active material, a chalcogenide is preferable in view of stability of crystal structure, voltage obtained from the battery, density and the like.

Preferable chalcogenides used as positive-electrode active materials for primary batteries include $MnO_2$, $V_2O_5$, $AgCrO_4$, $MoO_3$, CuO, CuS, $FeS_2$ and the like since these compounds can easily be synthesized. Preferable chalcogenides used as the positive-electrode active materials for secondary batteries include $Cu_2V_2O_7$, $MOS_3$, $V_6O_{13}$, $TiS_3$, $NbSe_3$, $V_2S_5$, $Cr_{0.5}V_{0.5}S_2$, $MoS_2$, $Cu_3Mo_6S_{7.9}$, $Cu_4Mo_6S_8$ and $Cr_3O_8$ in addition to the compounds listed above for the primary batteries since they are stable. Further, in the case where the carbon material capable of absorbing/desorbing (inserting/releasing) lithium as described above is used for the negative electrode and lithium is not contained in the negative electrode at the assembly of a battery, the chalcogenide preferably contains lithium because a battery of high voltage can be produced. Examples of such lithium-containing calcogenides are $LiNi_{1-x}Co_xO_2$ (wherein $0<X<1$), $LiCoO_2$, $LiNiO_2$, $LiFeO_2$, $LiMnO_2$, $LiMn_2O_4$, among which $LiNi_{1-x}Co_xO_2$ (wherein $0<X<1$) is preferred because a battery excellent in cycle characteristics can be expected.

The conductor is not particularly limited, and examples thereof include carbons such as carbon black, acetylene black and ketchen black, graphite particles (natural graphite, artificial graphite), metal particles, metal fibers and the like.

The binder is not particularly limited, but examples thereof include fluorine-containing polymers such as polytetrafluoroethylene and polyvinylidene fluoride, polyolefins such as polyethylene, polypropylene and ethylene-propylene copolymer, styrene-butadiene rubber and the like.

The mixture ratios of the conductor and the binder may be varied depending on the kinds of the conductor and the binder, but for example, the mixture ratio of the conductor may be about 1 to 50 parts by weight and that of the binder may be about 1 to 30 parts by weight, with respect to 100 parts by weight of the positive-electrode active material. If the conductor is used at a mixture ratio smaller than one part by weight, the resistance or polarization of the electrode increases and the discharge capacity declines. Therefore, a practical battery cannot be produced. If the conductor is used at a mixture ratio greater than 50 parts by weight, the amount of the active material contained in the electrode decreases and consequently the discharge capacity of the positive electrode declines. The binder, if used at a mixture ratio smaller than one part by weight, does not exhibit its binding ability. If the binder is used at a mixture ratio greater than 30 part by weight, the amount of the active material contained in the electrode decreases as in the case of the conductor, and the resistance or polarization of the electrode increases as discussed above. As a result, the discharge capacity declines. Therefore, such mixture ratios are not practical.

The collector mediates transfer of electrons from or to the positive electrode, and materials of the same kinds and in the same forms as for the negative electrode may be used.

Examples of the solid electrolytes include polyethylene oxide, polypropylene oxide, polyacrylonitrile, polyalkyl methacrylate, polyvinylidene fluoride and polytetrafluoroethylene, which may be used singly or as a mixture of two or more thereof.

The positive electrode can be formed in substantially the same manner as the negative electrode is formed.

The nonaqueous ionic conductor of the nonaqueous battery of the present invention may be of electrolyte solution type or of solid electrolyte type. The nonaqueous ionic conductor of electrolyte solution type is composed mainly of a nonaqueous solvent and an electrolytic salt. The nonaqueous ionic conductor of solid electrolyte type is composed mainly of a nonaqueous solvent as a plasticizer, an electrolytic salt and a polymeric component.

The solvent may be a diether compound having ether linkages at 1- and 3-positions, 1- and 4-positions or 2- and 3-positions of a straight-chain hydrocarbon having four carbon atoms. The diether compound may preferably be a dialkoxybutane since it is easily synthesized. Here the alkoxy groups of the dialkoxybutane are, the same or different, straight or branched chain alkoxy groups having one to four carbon(s). Examples thereof include methoxy, ethoxy, propoxy and butoxy groups. Examples of the dialkoxybutanes include 1,3-dimethoxybutane, 1,4-dimethoxybutane, 2,3-dimethoxybutane, 1,3-diethoxybutane, 1,4-diethoxybutane, 2,3-diethoxybutane, 1-methoxy-3-ethoxybutane, 1-methoxy-4-ethoxybutane, 2-methoxy-3-ethoxybutane and 1-ethoxy-3-methoxybutane since these compounds can readily be mixed with other solvents of high dielectric constant. Among these compound, 1,3-dimethoxybutane (1,3-DMB) and 1,4-dimethoxybutane (1,4-DMB) are more preferable because of their commercial availability. The above-described diether compounds may be used singly or as a mixture solvent of two or more thereof.

Preferably, the above-described diether compound is mixed with other one or more kind(s) of solvent(s) in an optional proportion in use. Examples of other solvents include solvents having a high dielectric constant such as ethylene carbonate (EC), propylene carbonate (PC), butylene carbonate (BC), γ-butyrolactone (BL) and sulfolane (SL), and solvents having a low viscosity such as 1,3-dimethoxyethane (DME), ethoxymethoxyethane (EME), 1,2-diethoxyethane (DEE), dimethyl carbonate (DMC), ethylmethyl carbonate (EMC), diethyl carbonate (DEC), tetrahydrofuran (THF), 2-methyltetrahydrofuran (2MeTHF) anddioxane (DO). Among these solvents, alicyclic carbonates, which are solvents of high dielectric constant, are preferred because they can raise degree of dissociation of the electrolyte. In particular, a single use or mixture solvent of ethylene carbonate and propylene carbonate is preferred because of its high safety. Here, the mixture ratio of the diether compound to said other solvent may be varied as required depending upon the kind of the diether compound and the kind of said other solvent, but may preferably be about 5:95 to 80:20 (diether compound/other solvent), more preferably about 10:90 to 50:50, by volume.

Examples of the electrolytic salts include lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$), bis(trifluoromethylsulfonyl)imide salt of lithium ($Li(CF_3SO_2)_2N$) and tris(trifluoromethylsulfonyl) methylidyne salt of lithium ($Li(CF_3SO_2)_3C$), which may be used singly or as a mixture of two or more thereof.

The nonaqueous ionic conductor of electrolyte solution type may be prepared by dehydrating the above-described solvent to a moisture concentration of 150 ppm or lower, and then dissolving the electrolytic salt in the resulting solvent in a concentration of about 0.5 to 2.5 mol/dm$^3$. A moisture concentration exceeding 150 ppm is not preferred because decomposition of water takes place in the battery. If the concentration of the electrolytic salt is lower than 0.5 mol/dm$^3$, sufficient ionic conductivity cannot be obtained. On the other hand, if the concentration of the electrolytic salt is higher than 2.5 mol/dm$^3$, association of the salt takes place and consequently the ionic conductivity declines.

The solvent used as a plasticizer in the nonaqueous ionic conductor of solid electrolyte type may be the same as mentioned above. The electrolytic salt may also be the same as described above. The polymeric component is not particularly limited, and any polymer that is usually used for an ionic conductor can be used. Examples thereof include polyolefin oxides, polyacrylonitrile (PAN) and polyvinylidene fluoride (PVDF) having a molecular weight of about 1,000 to about 200,000. In addition to the above described, a polymeric component containing a non-protonic polar solvent and a polymeric component including ion-leaving groups may be used.

The nonaqueous ionic conductor of solid electrolyte type can be prepared by dissolving the polymeric component and the electrolytic salt in the nonaqueous solvent as the plasticizer, adding a crosslinker to the resulting mixture and then allowing the resulting mixture to crosslink using ultra-violet rays, visible light, ionizing radiation or heat. The mixture ratio of the plasticizer to the polymeric component may preferably be about 1:99 to 95:5 (plasticizer/polymeric component), more preferably about 10:90 to 90:10, by volume. The concentration of the electrolytic salt may preferably be adjusted to about 0.5 to 2.5 mol/dm$^3$ with respect to the nonaqueous solvent as the plasticizer.

In the case where the nonaqueous ionic conductor of electrolyte solution type is used in addition to the above-described negative electrode, positive electrode and non-aqueous ionic conductor for the nonaqueous battery of the present invention, a separator may preferably be used for retaining the ion-conductive material of electrolyte solution type. Usable as the separator are non-woven fabrics, woven fabrics and microporous structures of electrical insulating synthetic resin fibers, glass fibers, natural fibers, and formed materials of powder such as of alumina. Among these materials, the non-woven fabrics and microporous structures of synthetic resins such as polyethylene, polypropylene and the like are preferred because of their stable quality. Some non-woven fabrics and microporous structures have an additional function of insulating the negative electrode from the positive electrode by being melted by heat when the battery generates unusual heat. Such fabrics and structures can be suitably used from the viewpoint of safety. The thickness of the separator is not particularly limited so long as the separator has such a thickness as keeps a necessary amount of electrolyte solution and prevents a short circuit between the positive and negative electrodes. The thickness may usually be about 0.01 to 1 mm, preferably about 0.02 to 0.05 mm.

The nonaqueous battery of the present invention is applicable to any form, e.g., a form of coin, button, sheet, cylinder, cube or the like.

In the case of producing a battery of a coin or button form, the positive and negative electrodes are generally formed into pellets, and the pellets are put into a case, which is then caulked with a lid with intervention of an insulating packing.

In the case of producing a battery of a cylindrical or cubic form, sheet electrodes are put in a case, the case and the electrodes are electrically connected, the electrolyte solution is put into the case and the case is sealed using a sealing plate with intervention of an insulating packing or by means of a hermetic seal which will insulate the sealing plate from the case. Here, a safety valve provided with a safety element can be used as the sealing plate. Examples of the safety elements include a fuse, a bimetal and a PTC device as overcurrent prevention devices. Besides the safety valve, a method of making a crack in a gasket, a method of making a crack in the sealing plate and a method of making a cut in the battery case may be adopted for copying with a rise in internal pressure of the battery. Also an external circuit having means against overcharge and/or overdischarge may be used.

The pellet-formed or sheet-formed electrodes are preferably dried or dehydrated beforehand. The drying or dehydration can be performed by a usual process. For example, hot-air, vacuum, infrared, far infrared, electron radiation and low-humidity air can be used singly or in combination for drying or dehydration. Temperature therefor is preferably within the range of 50 to 380° C.

EXAMPLES

The nonaqueous secondary battery of the present invention is now described in further detail by way of examples thereof, which should not be construed to limit the scope of the invention. It is noted that, in the following examples, the mean spacing between the (002) planes ($d_{002}$) and the lattice thickness (Lc, La) by the X-ray wide-angle diffractometry were determined by a known method such as described in the "Experimental Technology for Carbon Materials 1" p.p.55 to 63, 1978 (edited by the Society of Carbon Materials and published by Kagaku Gijutsu-Sha of Japan) and that the shape factor k used for obtaining Lc and La was 0.9.

Example 1

Preparation of Nonaqueous Ionic Conductor

In a solvent mixture of 1,4-DMB and PC in a volume ratio of 1:1, LiPF$_6$ was dissolved to prepare a nonaqueous ionic conductor having a LiPF$_6$ concentration of 1 mol/dm$^3$ (1M—LiPF$_6$/1,4-DMB+PC (1:1)).

Measurement of Ionic Conductivity

The ionic conductivity of the prepared 1M—LiPF$_6$/1,4-DMB+PC (1:1) was determined from AC impedance at 1 kHz at several temperatures using a cell provided with platinum electrodes and an LCR meter.

The results are shown in Table 1.

Example 2

A nonaqueous ionic conductor was prepared in substantially the same manner as in Example 1 except that a solvent mixture of 1,3-DMB and EC in a volume ratio of 1:1 was used. The ionic conductivity of the obtained 1M—LiPF$_6$/1,3-DMB+EC (1:1) was determined in the same manner as in Example 1.

The results are shown in Table 1.

Comparative Example 1

A nonaqueous ionic conductor was prepared in substantially the same manner as in Example 1 except that a single solvent of PC was used. The ionic conductivity of the obtained nonaqueous ionic conductor was determined in the same manner as in Example 1.

The results are shown in Table 1.

Comparative Example 2

A nonaqueous ionic conductor was prepared in substantially the same manner as in Example 1 except that a solvent mixture of DMC and EC in a volume ratio of 1:1 was used. The ionic conductivity of the obtained nonaqueous ionic conductor was determined in the same manner as in Example 1.

The results are shown in Table 1.

Table 1 shows that the ionic conductor containing 1,4-DMB or 1,3-DMB exhibits particularly excellent ionic conductivity within the temperature range of −40 to 0° C. and can be used in a nonaqueous electrolyte solution.

Example 3
Preparation of Negative Electrode

Artificial graphite (in the form of flakes, having a particle diameter of 9 μm, $d_{002}$ of 0.337 nm, and Lc and La of 100 nm) as carbon material was dispersed in N-methyl-2-pyrrolidone in which polyvinylidene fluoride had been dissolved as binder, thereby to prepare a paste of a negative-electrode active material. At this time, polyvinylidene fluoride was used in a proportion of 10 wt % to the whole carbon material. The paste was applied onto a copper-foil collector, preliminarily dried in the air at 60° C., dried at 150° C. in vacuum, and then pressed with a roller, thereby to produce a sheet-form negative electrode having a predetermined thickness. The negative electrode had an apparent surface area of 4 $cm^2$ and a thickness of 120 μm (including the thickness of the collector, 18 μm).

Single-Electrode Test on Negative Electrode

A tri-polar cell was produced using the negative electrode prepared by the above-described process together with a counter and a reference electrode of metallic lithium and a nonaqueous ionic conductor of 1M—$LiClO_4$/1,4-DMB+PC (1:1).

Evaluation was carried out in an globe box in an atmosphere of argon. Charge/discharge test was performed by charging the cell to 0V (relative to $Li/Li^+$) at a current density of 30 mA per gram of the negative-electrode active material and subsequently discharging the cell to 2.5V at the same current density.

Figure 2:
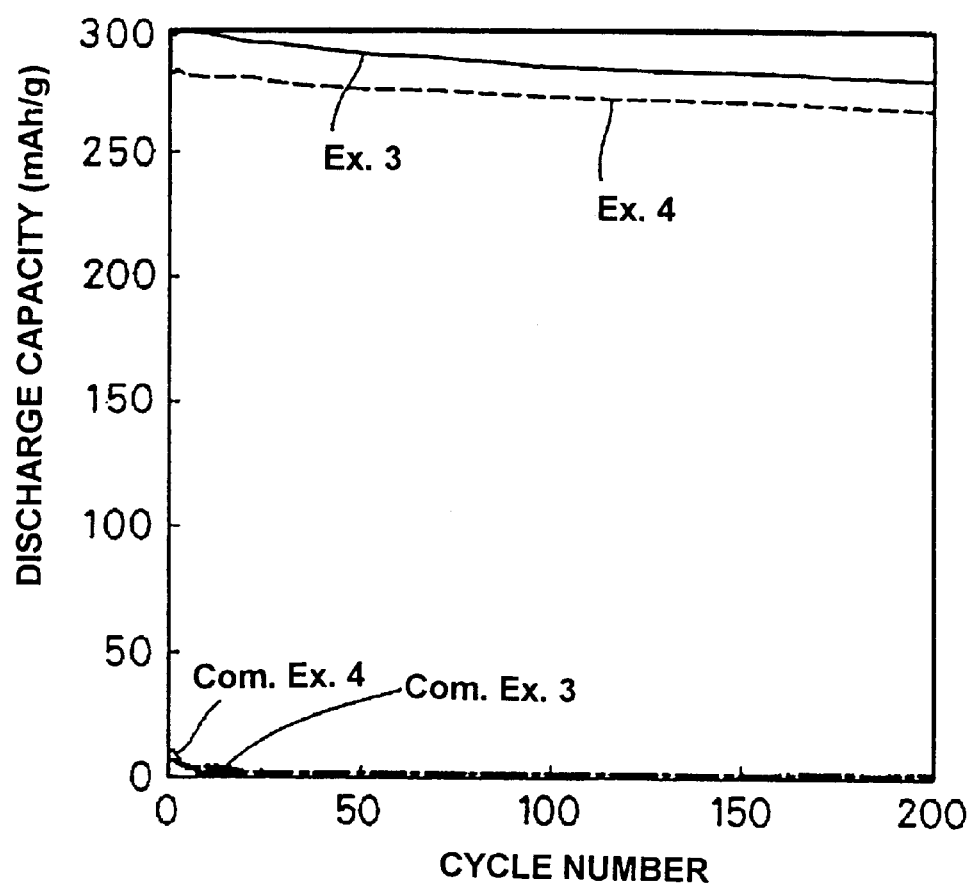
FIG. 2 is a graphical representation illustrating discharge capacities determined by a single-electrode test on negative electrodes in the cases where nonaqueous ionic conductors are used in nonaqueous batteries in accordance with the present invention.

The results are shown in Table 1 and FIG. 2.

Example 4

A negative electrode was prepared and the single-electrode test was carried out thereon in substantially the same manner as in Example 3 except that artificial graphite (in the form of flakes, having a particle diameter of 8 μm, $d_{002}$ of 0.339 nm, Lc of 27 nm and La of 40 nm) and 1M—$LiClO_4$/1,4-DMB+PC+EC (2:1:1) were used as carbon material and nonaqueous ionic conductor, respectively.

The results are shown in Table 1 and FIG. 2.

Example 5

A negative electrode was prepared and the single-electrode test was carried out thereon in substantially the same manner as in Example 3 except that natural graphite produced in Madagascar (in the form of lumps, having a particle diameter of 12 μm, $d_{002}$ of 0.335 nm, Lc of 17 nm and La of 27 nm) and 1M—$LiClO_4$/1,3-DMB+PC+EC (2:1:1) were used as carbon material and nonaqueous ionic conductor, respectively.

Figure 3:
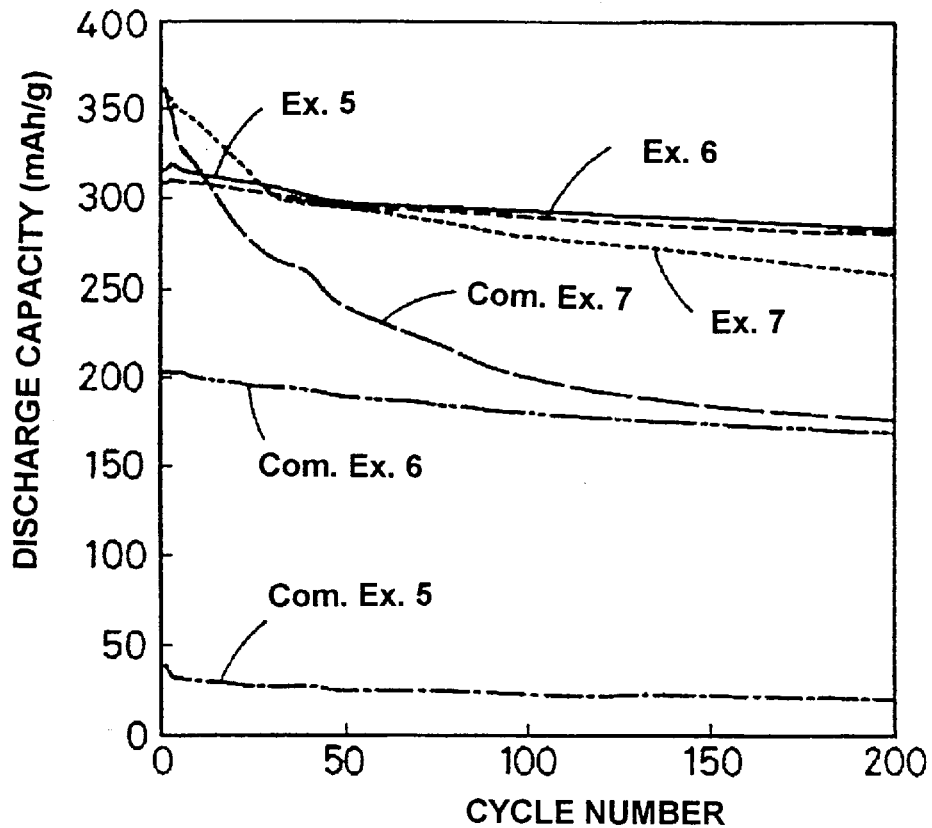
FIG. 3 is a graphical representation illustrating discharge capacities determined by a single-electrode test on negative electrodes in the cases where nonaqueous ionic conductors are used in nonaqueous batteries in accordance with the present invention.

The results are shown in Table 1 and FIG. 3.

Example 6

A negative electrode was prepared and the single-electrode test was carried out thereon in substantially the same manner as in Example 3 except that the artificial graphite used in Example 3 was used as carbon material after 10 wt % of amorphous carbon was adhered onto its surface, and that 1M—$LiClO_4$/1,3-DMB+EC (1:1) was used as nonaqueous ionic conductor.

The results are shown in Table 1 and FIG. 3.

Example 7

A negative electrode was prepared and the single-electrode test was carried out thereon in substantially the same manner as in Example 3 except that carbon black (in the form of sphere, having a particle diameter of 8 μm, $d_{002}$ of 0.358 nm, Lc of 2.0 nm and La of 10 nm) and 1M—$LiClO_4$/1,4-DMB+BL (1:1) were used as carbon material and nonaqueous ionic conductor, respectively.

The results are shown in Table 1 and FIG. 3.

Comparative Example 3

A negative electrode was prepared and the single-electrode test was carried out thereon in substantially the same manner as in Example 3 except that 1M—$LiClO_4$/DEE+PC (1:1) was used as nonaqueous ionic conductor.

The results are shown in Table 1 and FIG. 2.

Comparative Example 4

A negative electrode was prepared and the single-electrode test was carried out thereon in substantially the same manner as in Example 4 except that 1M—$LiClO_4$/DEE+PC+EC (2:1:1) was used as nonaqueous ionic conductor.

The results are shown in Table 1 and FIG. 2.

Comparative Example 5

A negative electrode was prepared and the single-electrode test was carried out thereon in substantially the same manner as in Example 5 except that 1M—$LiClO_4$/DME+PC+EC (2:1:1) was used as nonaqueous ionic conductor.

The results are shown in Table 1 and FIG. 3.

Comparative Example 6

A negative electrode was prepared and the single-electrode test was carried out thereon in substantially the same manner as in Example 6 except that 1M—$LiClO_4$/DME+EC (1:1) was used as nonaqueous ionic conductor.

The results are shown in Table 1 and FIG. 3.

Comparative Example 7

A negative electrode was prepared and the single-electrode test was carried out thereon in substantially the same manner as in Example 7 except that 1M—$LiClO_4$/EMC+EC (1:1) was used as nonaqueous ionic conductor.

The results are shown in Table 1 and FIG. 3.

TABLE 1

|  | Discharge Capacity at the First Cycle (mAh/g) | Discharge Capacity at the 200th Cycle (mAh/g) |
| --- | --- | --- |
| Example 3 | 298 | 280 |
| Example 4 | 282 | 268 |
| Example 5 | 315 | 284 |
| Example 6 | 308 | 282 |
| Example 7 | 362 | 259 |

TABLE 1-continued

|  | Discharge Capacity at the First Cycle (mAh/g) | Discharge Capacity at the 200th Cycle (mAh/g) |
|---|---|---|
| Comparative Example 3 | 7 | 2 |
| Comparative Example 4 | 10 | 2 |
| Comparative Example 5 | 40 | 20 |
| Comparative Example 6 | 204 | 170 |
| Comparative Example 7 | 360 | 177 |

Table 1 and FIGS. 2 and 3 show that the nonaqueous ionic conductors containing 1,4-DMB or 1,3-DMB are less reactive to the carbon materials in which lithium is absorbed or intercalated and more resistant to deterioration after charge/discharge cycles, than the nonaqueous ionic conductors containing a solvent of low viscosity having a short carbon chain such as DEE, DME or EMC.

Also shown is that a nonaqueous secondary battery having a large capacity can be produced if a graphite-type carbon material of high crystallinity is used as negative-electrode active material, because the discharge capacity declines if $d_{002}$ exceeds 0.340 nm.

Example 8

Evaluation of Coin-Form Primary Battery
Preparation of Positive Electrode $MnO_2$ particles as positive-electrode active material was mixed with acetylene black. Then a nonionic dispersant was added to the resulting mixture and a dispersion of polytetrafluoroethylene was added to render the mixture into a paste form. The paste was applied onto a titanium mesh collector. The obtained electrode was preliminarily dried at 60° C., pressed after thermal treatment at 240° C., and further dried at 200° C. in vacuum to remove moisture. A positive electrode was thus obtained.

Figure 4:
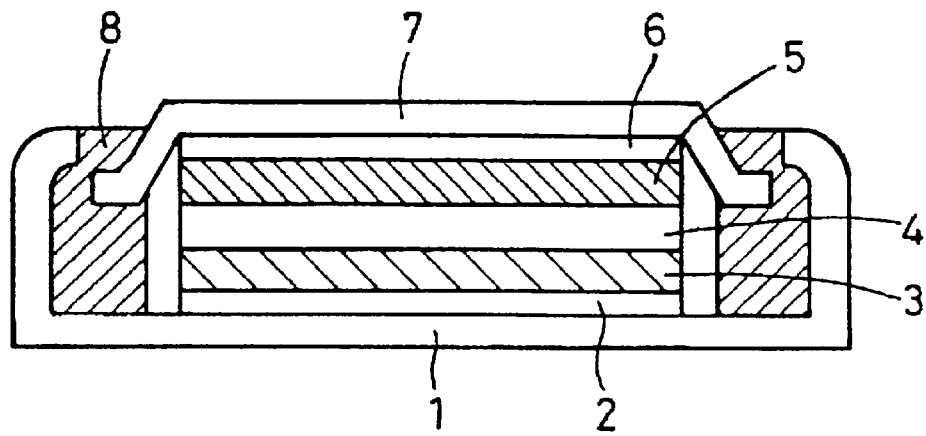
FIG. 4 is a schematic sectional view illustrating a coin-shaped nonaqueous battery in accordance with the resent invention.

The weight ratio of the positive-electrode active material, acetylene black and polytetrafluoroethylene was 100:10:5. The obtained positive electrode was in a tablet form of diameter 15 mm and of 0.93 mm thickness.
Preparation of Negative Electrode Metallic lithium as negative-electrode active material was contact-bonded to a nickel mesh collector. The obtained electrode was pressed into a negative electrode. This negative electrode was in a tablet form of diameter 14.5 mm and of 0.41 mm thickness.
Assembly of Coin-Form Battery As shown in FIG. 4, a positive-electrode collector 2 was attached to the inner bottom of a positive-electrode case 1 by welding and then a positive electrode 3 was contact-bonded.

Then a separator 4 of polypropylene non-woven was placed thereon. Further, the separator 4 was impregnated with a nonaqueous ionic conductor of 1.5M—$LiBF_4$/1,4-DMB+PC+EC (1:1:1).

A negative-electrode collector 6 was attached to the inner surface of a negative-electrode lid 7 by welding and then a negative electrode 5 was contact-bonded to the negative-electrode collector 6.

Then, the negative electrode 5 was put on the separator 4, the positive-electrode case 1 and the negative-electrode cover 7 were sealed by caulking with intervention of an insulating packing 8. A coin-shaped primary battery was thus produced.

One hundred coin-form primary batteries were produced in the same manner.
Evaluation of Batteries The produced batteries were subjected to a thermal cycle test at −20° C. to 100° C. The cycle was repeated 100 times. Then the batteries were discharged at a discharge current of 1 mA at 25° C. to a battery voltage of 2.5V. The discharge capacity and the shape of the batteries after discharge were evaluated.

The results are shown in Table 2.

Example 9

The coin-form primary batteries were evaluated in substantially the same manner as in Example 8 except that $V_2O_5$ powder and 1M—$LiCF_3SO_3$/1,3-DMB+PC (1:1) were used as positive-electrode active material and as nonaqueous ionic conductor, respectively.

The results are shown in Table 2.

Comparative Example 8

The coin-form primary batteries were evaluated in substantially the same manner as in Example 8 except that 1.5M—$LiBF_4$/DME+PC+EC (1:1:1) was used as nonaqueous ionic conductor.

The results are shown in Table 2.

Comparative Example 9

The coin-form primary batteries were evaluated in substantially the same manner as in Example 9 except that 1M—$LiCF_3SO_3$/EME+PC (1:1) was used as nonaqueous ionic conductor.

The results are shown in Table 2.

TABLE 2

|  | Average Discharge Capacity of Working Cells (mAh/g) | The Number of Deformed Cells (expansion, leakage of liquid, etc.) |
|---|---|---|
| Example 8 | 88 | 0/100 |
| Example 9 | 74 | 0/100 |
| Comparative Example 8 | 55 | 2/100 |
| Comparative Example 9 | 43 | 3/100 |

Table 2 shows that the batteries using the ionic conductors containing 1,4-DMB or 1,3-DMB are more stable even in an environment of a high temperature than those using the nonaqueous ionic conductors containing a low-viscosity solvent having a short carbon chain such as DME or DEE. It has also been found that the reactivity of the ionic conductors containing 1,4-DMB or 1,3-DMB with the chalcogenide and metallic lithium is extremely low.

Example 10

Evaluation of Cylindrical Secondary Battery
Preparation of Positive Electrode

Ten (10) parts by weight of $LiNi_{0.9}Co_{0.1}O_2$ as positive-electrode active material, 7 parts by weight of acetylene black powder as electric conductor and 10 parts by weight of polyvinylidene fluoride as binder were mixed with N-methyl-2-pyrrolidone as dispersant to produce a positive-electrode paste. The positive-electrode paste was applied on both sides of a aluminum-foil collector of 20 μm thickness, which was extended by pressure after drying and cut into strips.

An aluminum tab, as positive-electrode lead, was spot-welded to one end of the strip electrode thereby to produce a positive electrode 12. Cobalt-substituted lithium nickelate as the positive-electrode active material was present in the positive electrode at 40 mg/cm².

Preparation of Negative Electrode

One hundred (100) parts by weight of artificial graphite (in the form of flakes, having a particle diameter of 8 μm, $d_{002}$ of 0.337 nm, Lc of 25 nm and La of 13 nm) as negative-electrode active material and 10 parts by weight of polyvinylidene fluoride as binder were mixed with N-methyl-2-pyrrolidone as dispersant to produce a negative-electrode paste. The negative-electrode paste was applied on both sides of a copper-foil collector of 18 μm thickness, which was extended by pressure after drying and cut into strips.

A nickel tab as negative-electrode lead was spot-welded to one end of the strip electrode thereby to produce a negative electrode 13. Graphite as the negative-electrode active material was present in the negative electrode at 20 mg/cm².

Assembly of Cylindrical Battery

Figure 5:
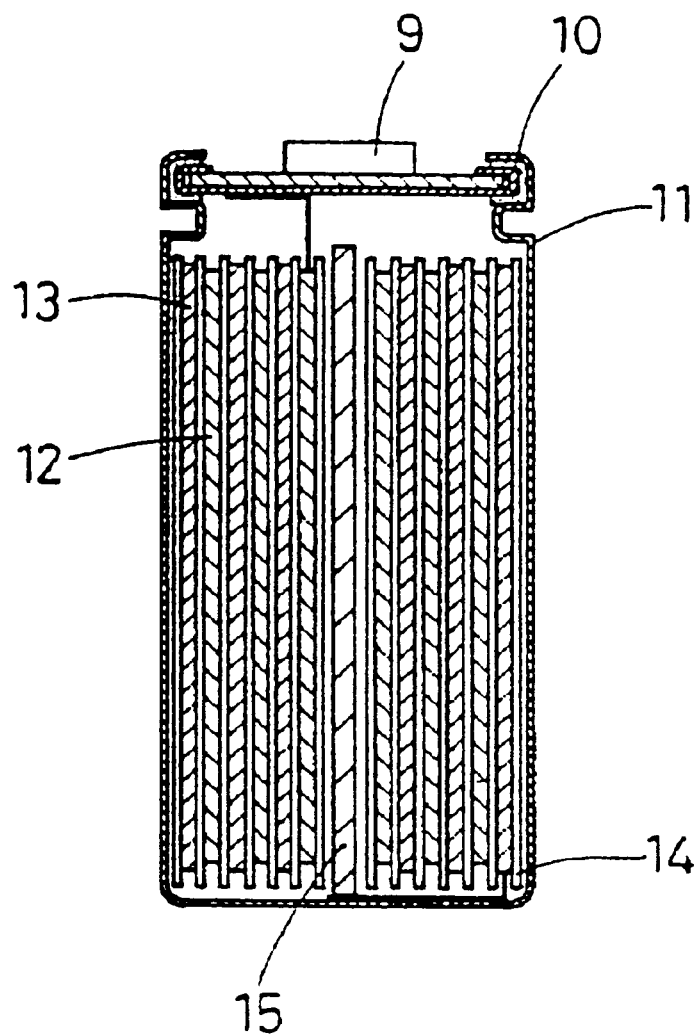
FIG. 5 a schematic sectional view illustrating a cylindrical nonaqueous battery in accordance with the present invention.

As shown in FIG. 5, the positive electrode 12 and negative electrode 13 were placed in an opposed relation with intervention of a microporous separator 14 of polyethylene and rolled into a roll.

The roll was placed in a battery case 11 (of stainless steel of 17 mm diameter and 50 mm height) with the positive-electrode lead and negative-electrode lead positioned upward and downward, respectively. The negative-electrode lead was spot-welded to the bottom of the battery case 11 and the positive-electrode lead was spot-welded to a positive-electrode lid 9 provided with a safety valve.

At the center of the roll, a center pin (a stainless tube of 3.4 mm diameter and 400 mm length) was provided for maintaining a rolled shape of the roll.

Then, 1M—LiPF$_6$/1,4-DMB+PC+EC (3:2:1) as nonaqueous ionic conductor was fed. The positive-electrode lid 9 was caulked with intervention of an insulating packing 10. A cylindrical secondary battery was thus made.

Evaluation of Battery

The produced cylindrical secondary battery was subjected to a constant-current constant-voltage charge at 500 mA with the upper limit voltage of 4.2V for 3 hours and to a constant-current discharge at 100 mA and with the lower limit voltage of 2.75V, in the environment of 25° C. The shape of the battery was also checked after the charge and discharge process.

Figure 6:
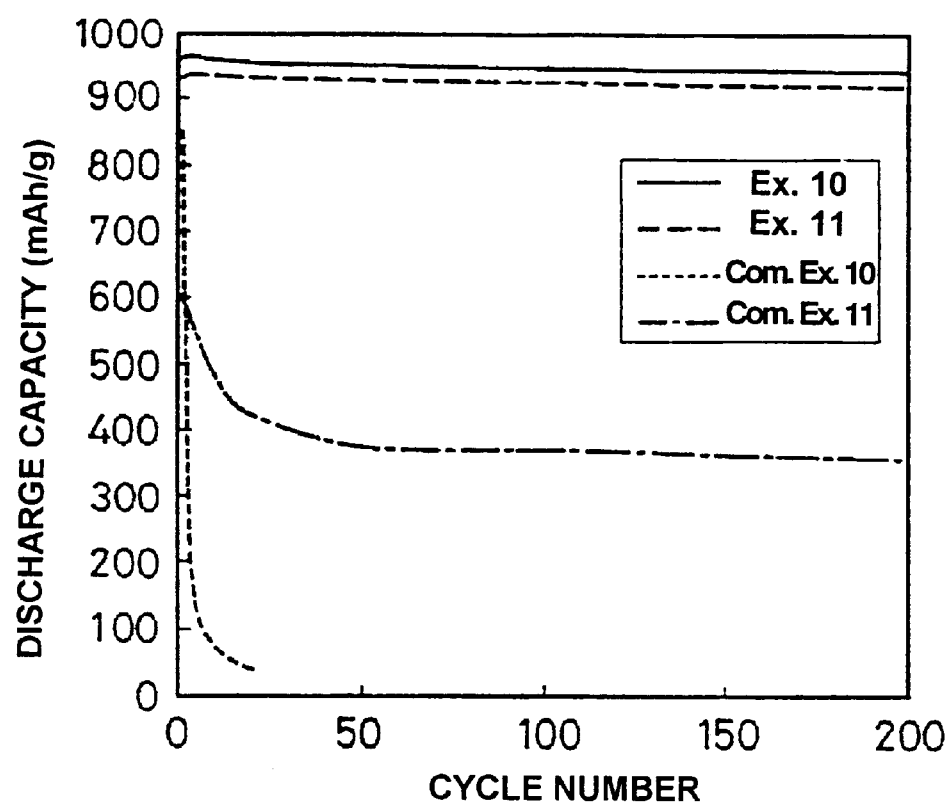
FIG. 6 is a graphical representation illustrating discharge capacities of cylindrical nonaqueous batteries in accordance with the present invention.

The results of the charge and discharge process are shown in FIG. 6. Nothing usual was found with the shape of the battery.

Example 11

A cylindrical secondary battery was evaluated in substantially the same manner as in Example 10 except that LiCoO$_2$ powder, graphite used in Example 6 to the surface of which amorphous carbon was attached and 1M—LiPF$_6$/1,3-DMB+PC+EC (1:1:1) were used as positive-electrode active material, negative-electrode active material and nonaqueous ionic conductor, respectively.

The results of the charge and discharge process are shown in FIG. 6.

Comparative Example 8

A cylindrical secondary battery was evaluated in substantially the same manner as in Example 10 except that 1M—LiPF$_6$/DEC+PC+EC (3:2:1) was used as nonaqueous ionic conductor.

The results of the charge and discharge process are shown in FIG. 6. After 20 charge/discharge cycles, the safety valve was broken due to a rise in the internal pressure of the battery, and the charge and discharge process was finished.

Comparative Example 9

A cylindrical secondary battery was evaluated in substantially the same manner as in Example 11 except that 1M—LiPF$_6$/DME+PC+EC (3:2:1) was used as nonaqueous ionic conductor.

The results of the charge and discharge process are shown in FIG. 6. Nothing unusual was found with the safety valve, but the battery swelled.

FIG. 6 shows that the nonaqueous ionic conductors containing 1,4-DMB or 1,3-DMB are less reactive to the lithium-containing chalcogenide or the carbon material in which lithium is absorbed or intercalated than the nonaqueous ionic conductors containing a low-viscosity solvent having a short carbon chain such as DEC and DME, and therefore it have been found that a nonaqueous secondary battery of large capacity which is not susceptible to deterioration after charge/discharge cycles can be produced.

According to the present invention, the nonaqueous battery includes a negative electrode containing a carbon material capable of absorbing/desorbing lithium, metallic lithium or a lithium alloy, a positive electrode containing a chalcogenide, and a nonaqueous ionic conductor containing a diether compound having ether linkages at 1- and 3-positions, 1- and 4-positions or 2- and 3-positions of a straight-chain hydrocarbon having four carbon atoms. By combining a nonaqueous ionic conductor which is extremely stable to the carbon material capable of absorbing/desorbing lithium, metallic lithium or the lithium alloy, a nonaqueous battery or a nonaqueous secondary battery can be produced which has a high capacity and a high energy density within a wide temperature range. The nonaqueous primary battery or a nonaqueous secondary battery exhibits excellent ionic conductivity at low temperatures, is stable at high temperatures because the boiling point of the ionic conductor is high, has excellent charge/discharge cycle characteristics, and has a long life against repeated charge/discharge cycles.

What is claimed is:

1. A nonaqueous battery comprising:
    a negative electrode containing a carbon material capable of absorbing/desorbing lithium, a metallic lithium or an lithium alloy;
    a positive electrode containing a chalcogenide; and
    a nonaqueous ionic conductor,
    wherein the nonaqueous ionic conductor contains a non-cyclic diether compound having ether linkages at 1- and 3-positions, 1- and 4-positions or 2- and 3-positions of a straight-chain hydrocarbon having four carbon atoms.

2. The nonaqueous battery according to claim 1, wherein the diether compound is a dialkoxybutane.

3. The nonaqueous battery according to claim 2, wherein the dialkoxybutane is dimethoxybutane, diethoxybutane or ethoxymethoxybutane.

4. The nonaqueous battery according to claim 3, wherein dimethoxybutane is 1,3-dimethoxybutane or 1,4-dimethoxybutane.

5. The nonaqueous battery according to claim 1, wherein the nonaqueous ionic conductor further contains an alicyclic carbonate.

6. The nonaqueous battery according to claim 5, wherein the diether compound and the alicyclic carbonate are present in a volume ratio of 5:95 to 80:20.

7. The nonaqueous battery according to claim 5, wherein the alicyclic carbonate is propylene carbonate, ethylene carbonate or a mixture thereof.

8. The nonaqueous battery according to claim 1, wherein the positive electrode contains a lithium-containing chalcogenide as a positive-electrode active material.

9. The nonaqueous battery according to claim 8, wherein the chalcogenide is $LiCoO_2$, $LiNiO_2$, $LiFeO_2$, $LiMnO_2$ or $LiMn_2O_4$.

10. The nonaqueous battery according to claim 8, wherein the chalcogenide is represented by the formula $LiNi_{1-x}Co_xO_2$, wherein $0<X<1$.

11. The nonaqueous battery according to claim 1, wherein the negative electrode contains, as a negative-electrode active material, a graphite having a mean spacing between the (002) planes ($d_{002}$) of from 0.335 to 0.340 nm and a lattice thickness of 10 nm or more in a direction of the (002) plane (Lc) and in a direction of a (110) plane (La) by X-ray wide-angle diffractometry.

12. The nonaqueous battery according to claim 11, wherein the negative-electrode active material is graphite particles having amorphous carbon on surfaces thereof.

13. The nonaqueous battery according to claim 2, wherein the diether compound has two straight or branched chain alkoxy groups, the same or different, having one to four carbon(s).

* * * * *